United States Patent
Kato

(10) Patent No.: US 6,830,225 B2
(45) Date of Patent: Dec. 14, 2004

(54) DEVICE FOR FIXING WIRE HARNESS

(75) Inventor: Mitsunobu Kato, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/411,266

(22) Filed: Apr. 11, 2003

(65) Prior Publication Data

US 2003/0222183 A1 Dec. 4, 2003

(30) Foreign Application Priority Data

May 29, 2002 (JP) ........................................ 2002-155258

(51) Int. Cl.$^7$ .............................................. H02G 3/00
(52) U.S. Cl. ............................. 248/49; 248/65; 248/73; 248/74.4
(58) Field of Search ............................. 248/49, 65, 73, 248/74.4; 138/108, 112; 174/92, 68.3, 99 R

(56) References Cited

U.S. PATENT DOCUMENTS

| | | | | | |
|---|---|---|---|---|---|
| 169,383 | A | * | 11/1875 | Starr ........................... | 403/90 |
| 1,672,605 | A | * | 6/1928 | Dobrick ........................ | 248/56 |
| 4,432,520 | A | * | 2/1984 | Simon .......................... | 248/56 |
| 5,109,321 | A | * | 4/1992 | Maglica et al. .............. | 362/191 |
| D326,646 | S | * | 6/1992 | Matsui ....................... | D13/199 |
| 5,283,393 | A | * | 2/1994 | Guginsky ............... | 174/102 R |
| 5,390,876 | A | * | 2/1995 | Hatano et al. ................. | 248/73 |
| 5,803,642 | A | * | 9/1998 | Sassmannshausen ......... | 403/90 |
| 5,873,550 | A | * | 2/1999 | Phillips ........................ | 248/73 |
| 5,918,844 | A | * | 7/1999 | Ognier ..................... | 248/276.1 |
| 5,941,483 | A | * | 8/1999 | Baginski ..................... | 248/68.1 |
| 6,039,725 | A | * | 3/2000 | Moenning et al. .............. | 606/1 |
| 6,056,245 | A | * | 5/2000 | White .......................... | 248/58 |
| 6,070,835 | A | * | 6/2000 | Stillinger ..................... | 248/56 |
| 6,085,795 | A | * | 7/2000 | Ogawa et al. .............. | 138/108 |
| 6,126,135 | A | * | 10/2000 | Derman ....................... | 248/551 |
| 6,309,345 | B1 | * | 10/2001 | Stelzer et al. ............... | 600/106 |
| 6,335,672 | B1 | * | 1/2002 | Tumlin et al. .............. | 336/175 |
| 6,595,473 | B2 | * | 7/2003 | Aoki et al. ................. | 248/74.4 |
| 2003/0183413 | A1 | * | 10/2003 | Kato .......................... | 174/135 |

* cited by examiner

Primary Examiner—Ramon O. Ramirez
Assistant Examiner—Ingrid Weinhold
(74) Attorney, Agent, or Firm—Armstrong, Kratz, Quintos, Hanson & Brooks, LLP.

(57) ABSTRACT

A device 1 for fixing a wire harness 5 includes a rotary member 6 which holds the wire harness and has an arc-shaped face in a three dimensional direction on its outer peripheral face, and a body 3 of the fixing body in which the rotary member is held so as to rotate in a three dimensional direction. The rotary member 6 has a generally spherical shape and can be divided into pieces. In the rotary member 6, there is formed an insertion part in which a corrugate tube 8 surrounding the wire harness 5 is inserted and held. The rotary member 6 is held in the body 3 of the fixing device so as to move in a longitudinal direction of the wire harness. There is formed, in the body 3, a space 4 for receiving the rotary member 6, and stopper parts 29 against which the rotary member is abutted at opposite ends of the space in its axial direction. Either of the body 3 and the rotary member 6 is provided with a harness guide wall 32 consisting of a shorter wall portion 33 and a longer wall portion 34.

10 Claims, 3 Drawing Sheets

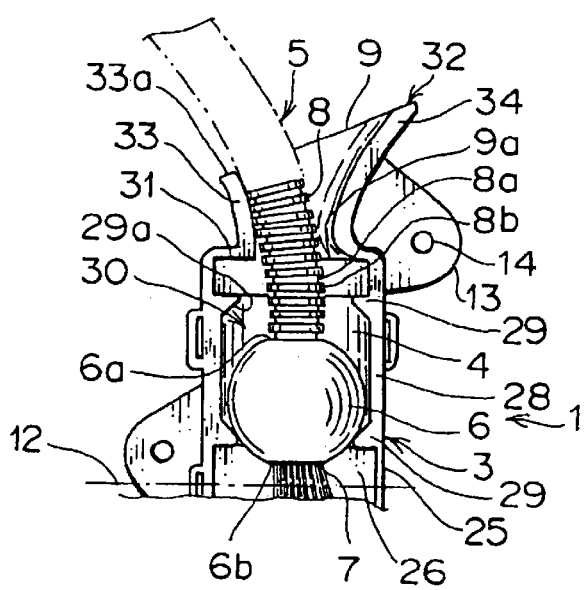 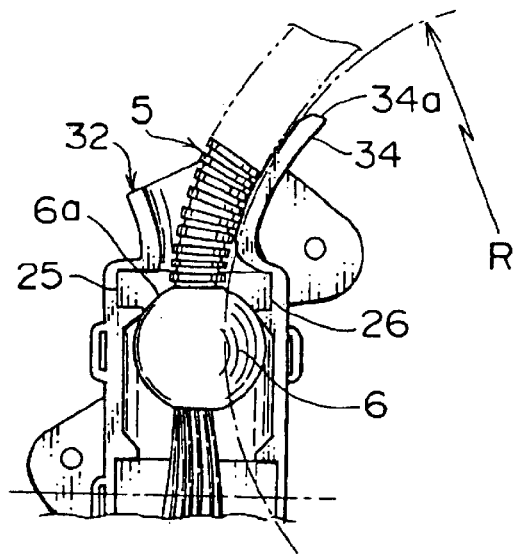
FIG. 2A    FIG. 2B
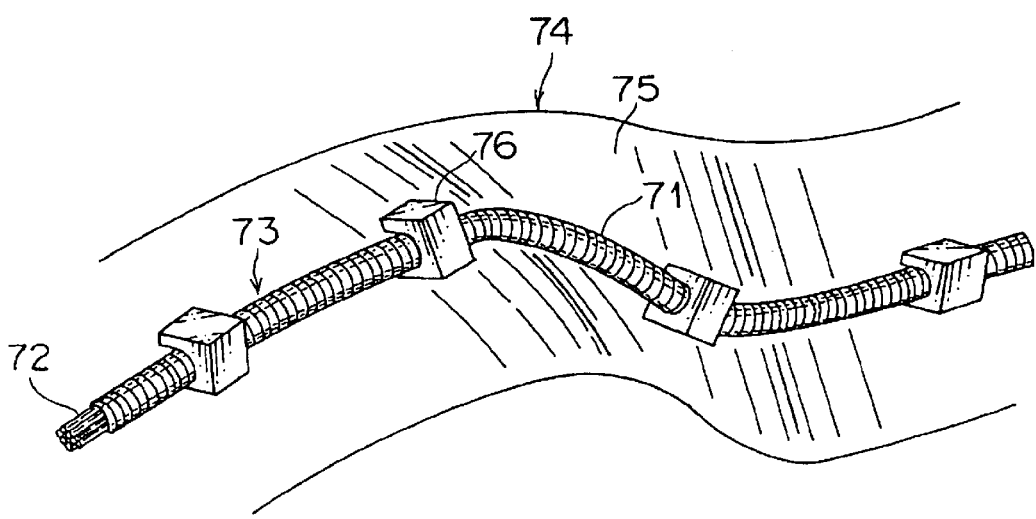
FIG. 5
PRIOR ART

DEVICE FOR FIXING WIRE HARNESS

BACKGROUND OF THE INVENTION

1. Field of Art

The present invention relates to a device for fixing a wire harness which is installed in an automobile or the like, in such a manner that the wire harness can be bent smoothly in a three dimensional direction thereby to be prevented from being damaged.

2. Description of the Related Art

FIG. 5 shows an example of a conventional device for fixing a wire harness.

A device 76 for fixing a wire harness is intended to fix the wire harness 73 to a vehicle body or the like. The wire harness 73 is composed of a plurality of electric wires 72 covered with a corrugate tube 71. The corrugate tube 71 is made of synthetic resin and formed into a thin-walled cylindrical shape. The corrugate tube 71 is rich in flexibility, having circumferential grooves and ridges which are alternately arranged at an equal pitch in parallel in a longitudinal direction of the tube.

The corrugate tube 71 serves as an electric wire protecting tube, and can be easily curved together with the plurality of the electric wires 72 in correspondence with a curved shape in two or three dimensions of a panel 75 of the vehicle body or the like which is a site 74 to be mounted, so that workability in installing the wire harness 73 can be enhanced.

There have been two types of the corrugate tube 71, as to whether or not the corrugate tube is provided with a slit in a longitudinal direction. In the corrugate tube 71 of the type having the slit, the electric wire 72 can be easily inserted into the corrugate tube 71 through the slit. On the other hand, in the corrugate tube 71 of the type having no slit, an insertion work of the electric wire 72 is rather annoying, but there is no anxiety that the slit may be opened, and so, it is not necessary to wrap a vinyl tape around the corrugate tube 71 for preventing the slit from being opened.

The device 76 for fixing the wire harness is designed, for example, as a clamp for pressing the corrugate tube 71 onto the panel 75 at the mounted site 74. The device 76 for fixing the wire harness has to be necessarily arranged along at least the curved areas of the mounted site 74 such as the vehicle body or the like. It is also possible to employ other fastening means such as a band, as the device for fixing the wire harness.

The device 76 for fixing the wire harness is fixed to the panel 75 at the mounted site 74 by means of flexible retaining clips, small screws and so on. The retaining clip (not shown) has a pair of flexible retaining pieces, and adapted to be inserted into a hole in the panel 75 to retain the device 76. In case of using the small screw (not shown), the small screw which is inserted into a bracket of the device 76 is screwed into a threaded hole in the panel 75 to fix the device 76 for fixing the wire harness.

The wire harness 73 is installed along the curved face of the mounted site 74 of the vehicle body or the like, and the corrugate tube 71 surrounding the wire harness is firmly fixed to the mounted site 74, employing a plurality of the devices 76 for fixing the wire harness arranged in a longitudinal direction. In this manner, the wire harness 73 is rigidly fixed to the mounted site 74, and prevented from displacement caused by vibration during a drive of the vehicle, interference of the wire harness 73 with the vehicle body (the mounted site 74), strange noises occurring therefrom, and so on.

The electric wires 72 inside the corrugate tube 71 are protected from rain water, dust and so on by the corrugate tube 71, and at the same time, extended along the vehicle body (the mounted site 74) up to predetermined positions such as an instrument panel, a floor, doors (hinged doors or sliding doors), etc. to be connected to their electric components or auxiliary parts by way of connectors.

However, the above described conventional device 76 for fixing the wire harness has had such a drawback that when the corrugate tube 71 has been fixed with the devices 76 to the curved areas of the mounted site 74 in a cubical shape, such as the vehicle body, in order to fix the wire harness 73, the electric wires 72 as well as the corrugate tube 71 maybe crooked, and torsion may occur. As the corrugate tube itself has received a stress of this torsion, such problems has arisen that the corrugate tube 71 may be deformed or damaged, or the slit may be opened. When the slit has been opened, it has been concerned that the electric wires inside the corrugate tube 71 may be exposed to the exterior and stamped with a foot or the like, and water or dust may intrude from the open slit.

Moreover, there has been such an anxiety that the corrugate tube 71 may be worn or broken from rubbing against an end portion of the device 76 for fixing the wire harness due to a tensional force it has been receiving. Further, in case where the wire harness 73 has been installed at an acute angle, or violently swayed around the device 76 as a fulcrum, the wire harness 73 as well as the corrugate tube 71 has been liable to be deformed or rubbed against the end portion of the device 76 for fixing the wire harness, that is, at the opening from which the corrugate tube 71 has been guided out. In such cases, it has been a problem that the corrugate tube 71 and the electric wires 72 contained therein may be liable to be damaged.

Particularly, when the wire harness is installed along the vehicle body, for example, in a three dimensional shape, the wire harness tends to be bent or swayed vertically and laterally in all the directions. Therefore, it has been eagerly desired that the wire harness may be smoothly curved or swayed in correspondence with the shape, thereby to reliably prevent the wire harness from being worn or damaged due to its torsion or rub.

Although the corrugate tube has been referred to as the protective tube in the above described example of the prior art, such problems as described above are also liable to occur, even in case where other protective means beside the corrugate tube such a net-like tube made of synthetic resin, a soft covering material, or a vinyl tape have been employed.

In view of the above described problems, it is an object of the present invention to provide a device for fixing a wire harness which can reliably avoid a torsion of the wire harness, including a protective tube and electric wires, even though the wire harness has been bent or swayed in a three dimensional direction while the wire harness is being fixed or bent for installation, and can reliably prevent the protective tube and the electric wires from being rubbed or broken.

SUMMARY OF THE INVENTION

In order to attain the above described object, there is provided according to the present invention, a device for fixing a wire harness comprising a rotary member which holds the wire harness and has an arc-shaped face in a three dimensional direction on its outer peripheral face, and a body of the fixing device in which the rotary member is held so as to rotate in a three dimensional direction.

Owing to the above described structure, the rotary member holding the wire harness can rotate in a three dimensional direction inside the body of the fixing device, when the wire harness is being installed, bent or swayed. Thus, the wire harness will be smoothly bent in any direction in three dimensions. Moreover, torsion of the wire harness can be effectively absorbed, because the rotary member can rotate in all the directions. In this manner, an excessive bending force or torsional force will not affect the wire harness, and the wire harness will be reliably prevented from being deformed or damaged.

According to another aspect of the invention, in the device for fixing a wire harness, the rotary member has a spherical shape.

Owing to such structure, the rotary movement of the rotary member in the three dimensional direction will be smoothly performed with a constant force, and absorption of the bending force and torsional force by the rotation of the rotary member can be more smoothly performed.

According to a further aspect of the invention, in the device for fixing a wire harness, the rotary member can be divided into pieces.

This structure will facilitate attaching and detaching operations of the wire harness to the rotary member, and enhance assembling workability of the device for fixing the wire harness.

According to a still further aspect of the invention, in the device for fixing a wire harness, the rotary member has an insertion part in which a corrugate tube covering the wire harness is held.

This structure enables the corrugate tube to be held by the rotary member, and the electric wires inside the corrugate tube will be able to move freely. Consequently, a large bending force or torsional force will not be exerted on the electric wires.

According to a still further aspect of the invention, in the device for fixing a wire harness, the rotary member is held in the body of the fixing device so as to move in a longitudinal direction of the wire harness.

On occasion where a tensile force or compressive force is applied to the wire harness when the wire harness is being installed, bent or swayed, the wire harness will move back and forth in a longitudinal direction together with the rotary member, thereby to absorb the tensile force and compressive force. Moreover, because the wire harness is projected long to the exterior of the body of the fixing device as the rotary member advances, the wire harness will be able to be curved with a large radius, and thus, the wire harness will be prevented from being affected by an excessive bending stress and from interfering with the exterior. Consequently, deformation, abrasion, or damages of the wire harness will be avoided.

According to a still further aspect of the invention, in the device for fixing a wire harness, the body of the fixing device has a space having a uniform inner diameter for receiving the rotary member, and stopper parts against which the rotary member is abutted at opposite ends of the space in its axial direction.

This structure enables the rotary member to slide freely and smoothly in the axial direction along the space in the body of the fixing device, thereby to smoothly absorb the tensile force or compressive force in the axial direction of the wire harness, and the wire harness will be able to be curved with a large radius. The most advanced position and the most retreated position of the rotary member are determined by abutment of the rotary member against the stopper parts.

According to a still further aspect of the invention, in the device for fixing a wire harness, the stopper parts have smooth guide faces in correspondence with an outer peripheral face of the rotary member.

Owing to the structure, in a state where the rotary member is abutted against either of the stopper parts, the rotary member can rotate in a three dimensional direction with a small force without cogging. Thus, the wire harness will be able to be more smoothly curved with a large radius.

According to a still further aspect of the invention, in the device for fixing a wire harness, either one of the body of the fixing device and the rotary member is provided with a harness guide wall in a curved shape.

Owing to this structure, the wire harness guided out from the rotary member is curved with a large radius along the harness guide wall. As the results, the wire harness will be smoothly curved and prevented from being damaged. Moreover, with the back and forth movement of the rotary member in a longitudinal direction of the wire harness, the wire harness will be contacted with the harness guide wall at different contact positions, and contact load will be dispersed. Consequently, abrasion of the wire harness can be decreased.

According to a still further aspect of the invention, in the device for fixing a wire harness, the harness guide wall has a longer wall portion which comes in contact with the wire harness when the rotary member has advanced, and a shorter wall portion which comes in contact with the wire harness when the rotary member has retreated.

Owing to the above described structure, a distance from the rotary member to a distal end of the harness guide wall will be substantially the same in both the advanced position and the retreated position of the rotary member, and the wire harness can be held with the substantially same radius of curvature by means of the longer wall portion and the shorter wall portion of the harness guide wall. Thus, the wire harness will be free from an excessive bending force, smoothly curved with a large radius, and prevented from being damaged.

According to a still further aspect of the invention, in the device for fixing a wire harness, the body of the fixing device can be divided.

This structure facilitates attaching and detaching operations of the rotary member and the wire harness to the body of the fixing device, and assembling workability will be enhanced.

According to a still further aspect of the invention, in the device for fixing a wire harness, the body of the fixing device is a part of a harness protector.

Owing to this structure, the wire harness will be safely protected in the harness protector without interfering with the exterior.

In conclusion, according to the present invention, quality of the wire harness will not be deteriorated with time, and reliability of the wire harness in power supply and signal supply will be enhanced.

BRIEF DESCRIPTION OF THE DRAWINGS

FIG. 2A is a plan view showing an interior of the device for fixing the wire harness, in a state where a rotary member has retreated;

FIG. 2B is a similar plan view showing the interior of the device for fixing the wire harness, in a state where the rotary member has advanced;

FIG. 5 is a perspective view showing the wire harness which has been installed, employing conventional devices for fixing the wire harness.

DESCRIPTION OF THE PREFERRED EMBODIMENTS

Figure 1:
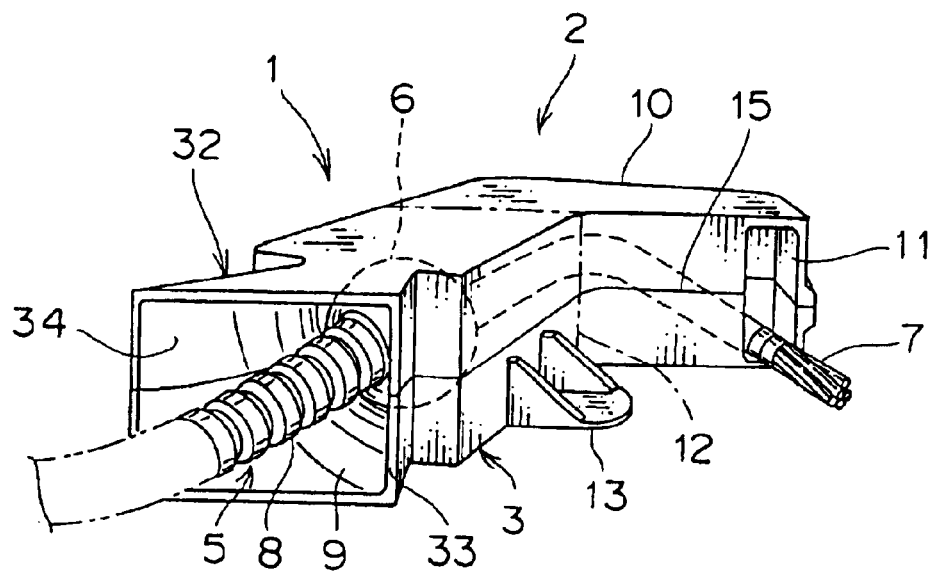
FIG. 1 is a perspective view showing a harness protector including a device for fixing a wire harness according to the present invention.

Now, a preferred embodiment according to the present invention will be described referring to the drawings.

FIGS. 1, 2A, and 2B show an embodiment of the device for fixing the wire harness according to the present invention.

The device 1 for fixing the wire harness in this embodiment is provided integrally in a harness protector 2, as shown in FIG. 1. In an inner space 4 of a body 3 of the fixing device, there is contained a rotary member 6 in a spherical shape for a wire harness 5 to be inserted and held therein, as shown in FIGS. 2A and 2B. The rotary member 6 is adapted to rotate in a three dimensional direction in the inner space 4 in the body 3 of the fixing device, and also to move back and forth in a longitudinal direction of the wire harness.

In FIG. 1, the wire harness 5 is composed of a plurality of electric wires 7 and a corrugate tube 8 made of synthetic resin, which covers an outside of the electric wires. The wire harness 5 is introduced from a front opening 9 of the device 1 for fixing the wire harness which is enlarged in a substantially bell-like shape, and via an insertion part in a center of the rotary member 6 in a spherical shape and an inner space of a protector body 10, is guided out from a rear opening 11 of the protector body 10. It is to be noted that the terms "front" and "rear" herein referred to are used for convenience of explanation only, but may be referred to as "right and left", or "up and down" according to a state where the fixing device is actually used. The corrugate tube 8 employed in this embodiment is the same as in the prior art, which is formed having grooves 8a and ridges 8b alternately arranged in a longitudinal direction of the wire harness.

Although the device 1 for fixing the wire harness in this embodiment is designed as a part of the harness protector 2, it is of course possible to use only the fixing device 1 by itself, omitting (without providing from the beginning) a backward part beyond a dotted line 12 in FIG. 2a. In case where the device 1 for fixing the wire harness has been employed also as the harness protector 2, which is merely one of the preferred embodiments, the wire harness 5 can be safely protected by the rigid protector body 10 from interfering with the exterior or from being stamped with foot.

The device 1 for fixing the wire harness is fixed to a vehicle body or the like by means of a bracket 13 which is integrally provided on the body 3 of the fixing device. As seen in FIG. 2A, a bolt insertion hole 14 is formed in the bracket 13 made of synthetic resin. The body 3 of the fixing device and the protector body 10 are formed in a substantially rectangular tubular shape, and can be divided into an upper part and a lower part. In FIG. 1, reference numeral 15 designates a divisional line (a joint line).

Figure 3:
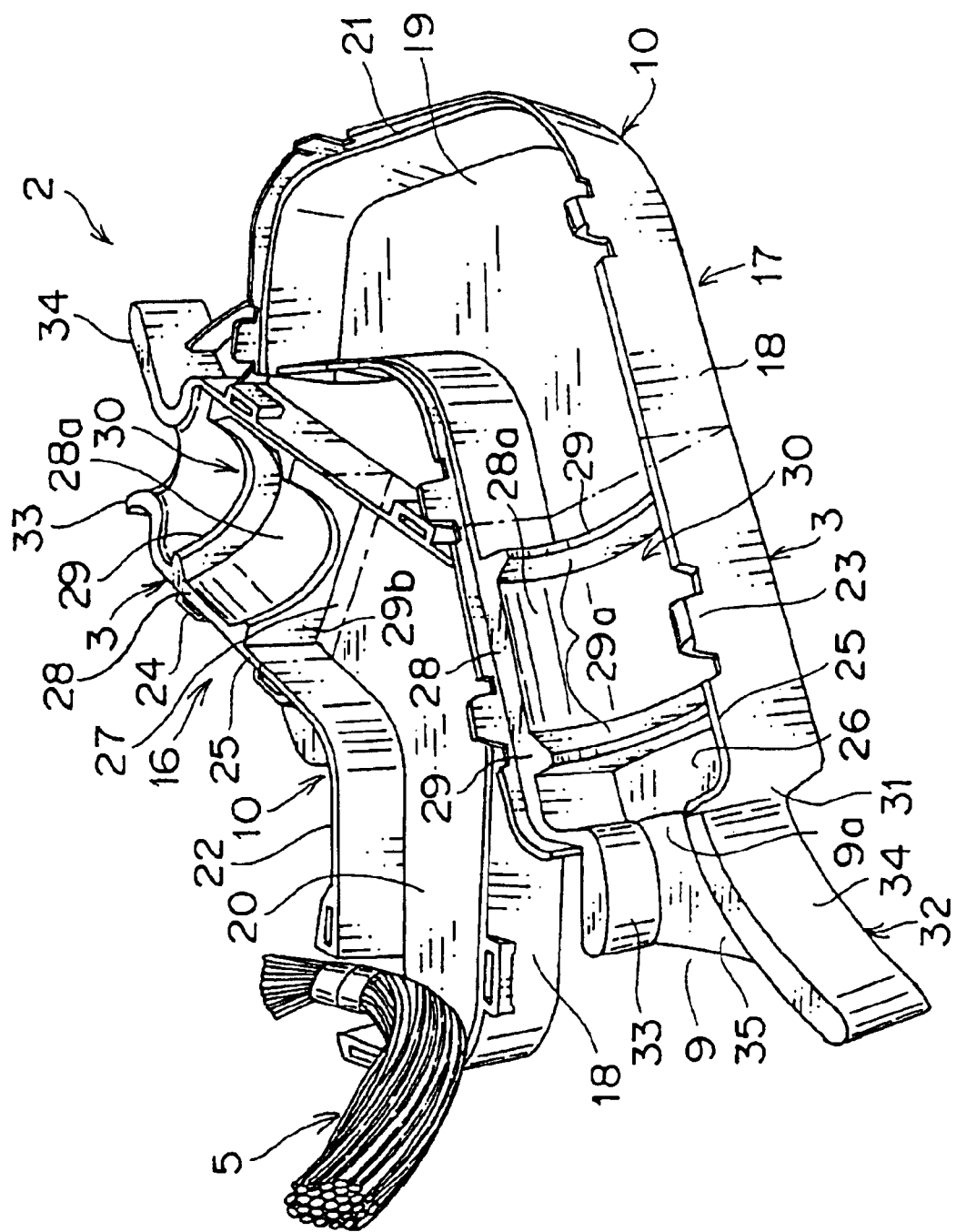
FIG. 3 is an exploded perspective view of the harness protector including a body of the fixing device.

In FIG. 3, the harness protector 2 is shown in an exploded view in which an upper and a lower divisional members 16, 17 are symmetrically arranged. Each of the divisional members 16, 17 is formed in a shape of a trough in a longitudinal direction, having a substantially concave shape in cross section, and provided with opposite side walls 18, a bottom wall 19 and a top wall 20. An edge 22 of the upper divisional member 16 is engaged with a stepped part 21 on a top of the lower divisional member 17, so that inner faces of the side walls 18 of both the upper and lower divisional members 16, 17 are aligned with each other on a same plane. The side walls 18 of the lower divisional member 17 are respectively provided with locking hooks 23, while the side walls 18 of the upper divisional member 16 are provided with locking frames 24 for the locking hooks 23 to be engaged therewith. Locking means are not limited to these locking hooks 23 and locking frames 24, but other locking means may be employed. For example, a combination of locking projections and locking holes (not shown) may be employed.

The body 3 of the fixing device is integrally formed in a forward part of the protector body 10. The body 3 of the fixing device includes thin-walled opposite side walls 25, a bottom wall 26, and a top wall 27. There are formed, inside the body 3, thick-walled receiving walls 28 having a semi-circular shape in cross section which are integrally continued from the side walls 25, the bottom wall 26 and the top wall 27. A pair of stopper walls (stopper parts) 29 are integrally projected like a flange (a semi-annular shape) having a wedge-like shape in cross section at longitudinally opposite ends of each of the receiving walls 28. The receiving wall 28 has a uniform inner diameter in a longitudinal direction of the wire harness, and has a smooth inner face 28a which is curved in a semicircular shape in cross section having the same diameter. Each of the stopper walls 29 has a smooth guide face 29a in a tapered or curved shape inside, and a straight upright face 29b outside. An inner space enclosed within the receiving walls 28 and the stopper walls 29 is designed as a holding part 30 for containing the rotary member 6 in a spherical shape (See FIG. 2A).

As seen in FIG. 2A, an inner diameter of the receiving wall 28 is set to be slightly larger than an outer diameter of the spherical rotary member 6, and an inner diameter of the flange-like stopper wall 29 is set to be considerably smaller than the outer diameter of the rotary member 6, so that the rotary member 6 can move back and forth in a longitudinal direction of the harness in the holding part 30. A large moving stroke of the rotary member 6 can be obtained, because the backward and forward end portions 6a, 6b of the rotary member 6 are projected outward beyond the stopper walls 29, but at the same time, it is possible to downsize the device 1 for fixing the wire harness in a longitudinal direction. The moving stroke of the rotary member 6 can be optionally adjusted by extending the receiving wall 28 in a longitudinal direction. However, in this embodiment, a length of the holding part 30 in a longitudinal direction is set to be substantially the same as or slightly larger than the outer diameter of the rotary member 6.

After the rotary member 6 has been received in the upper and lower holding parts 30, the upper and lower divisional members 16, 17 are closed, and thus, the rotary member 6 is held in the barrel-shaped holding parts 30 so as to rotate in a circumferential direction and so as to move in a longitudinal direction of the wire harness. Upper end faces of the receiving wall 28 and the stopper walls 29 in the lower divisional member 17 are tightly contacted with lower end faces of the receiving wall 28 and the stopper walls 29 in the upper divisional member 16 simultaneously, when the divisional members 16 and 17 have been engaged. In this manner, the inner peripheral faces 28a of the upper and lower receiving walls 28 are continued on the same plane without a step difference, and the guide faces 29a of the upper and lower stopper walls 29 are continued on the same plane, thereby to constitute the holding part 30 which has a circular shape in cross section. A space 4 having a uniform inner diameter is formed inside this holding part 30, as seen in FIG. 2A.

In order to cover the projected portions 6a, 6b (FIG. 2A) at the forward and backward ends of the rotary member 6 and protect them without an interference with the exterior, it is necessary to provide the thin-walled side walls 25, and the bottom wall 26 or the top wall 27 in a forward and backward areas of the upper and lower holding parts 30. The thin-walled side walls 25, and the bottom wall 26 or the top wall 27 in the forward area are continued to a forward end wall 31 having a bottleneck shape. The forward end wall 31 is provided with an opening 9a for passing the wire harness, and a harness guide wall 32 which is curved and gradually enlarged in diameter in a substantially bell shape are protruded forwardly from a peripheral edge of the opening 9a. In this embodiment, the right and left wall portions 33, 34 of the harness guide wall 32 have different lengths of protrusion from each other, but their radius of curvature are substantially the same. The length of protrusion, the radius of curvature and so on of the wall portions 33, 34 can be appropriately determined according to mode for use of the wire harness.

An inner diameter of the opening 9a in the forward end wall 31 is set to be slightly larger than an outer diameter of the wire harness 5 and slightly smaller than the inner diameter of the stopper wall 29 in the holding part 30. Essentially, the diameter of the opening 9a is set to be at such a size that at an advanced position of the rotary member 6 as seen in FIG. 2B, the wire harness 5 which has been guided out from the rotary member 6 can be smoothly and beautifully curved along the harness guide wall 32 without being broken.

Four wall portions of the harness guide wall 32 in all the four directions are preferably enlarged in a curved or tapered shape. Although the harness guide wall 32 in this embodiment is formed substantially in a shape of a rectangular tube in correspondence with a shape of the harness protector 2, it is also possible to form the harness guide wall 32 in an annular shape in correspondence with the bend or sway of the wire harness 5 in all the directions of 360 degree. As seen in FIG. 3, the harness guide wall 32 is composed of the opposite side wall portions 33, 34, and an upper and lower wall portions 35 having the same area in correspondence with the upper and lower bodies 3 of the fixing device. These wall portions are joined together to form the harness guide wall 32 in a rectangular shape, when the upper and lower bodies 3 of the fixing device have been assembled.

A distance from the forward end portion 6a of the rotary member 6 to a distal end 33a of the side wall portion 33 of the harness guide wall 32 in a retreated position of the rotary member 6 as seen in FIG. 2A is set to be substantially equal to a distance from the forward end portion 6a of the rotary member 6 to a distal end 34a of the other side wall portion 34 of the harness guide wall 32 at the advanced position of the rotary member 6. Accordingly, a length of the wire harness 5 which has been guided out from the forward end 6a of the rotary member 6 until the wire harness 5 arrives at the distal ends 33a, 34a of the wall portions 33, 34 while abutting against the wall portions 33, 34 is substantially the same in FIG. 2A and in FIG. 2B. As the results, a radius of curvature of the wire harness 5 will be the same in FIG. 2A and in FIG. 2B, and the wire harness 5 can be smoothly and beautifully curved with a large radius of curvature (R), so that a damage of the wire harness 5 can be prevented.

In case where the other side wall portion 34 of the harness guide wall 32 is as short as the one side wall portion 33 in the advanced position of the rotary member 6 in FIG. 2B, for example, a distance from the forward end 6a of the rotary member 6 and the distal end 34a of the other wall portion 34 will be extremely short. In this case, the wire harness 5 is liable to be bent outwardly at the distal end 34a of the wall portion 34, and will be unable to be smoothly curved. Such anxiety will be solved according to the harness guide wall 32 in the embodiment of FIGS. 2A and 2B, and the wire harness 5 can be smoothly curved with the large radius of curvature.

The rotary member 6 is brought into the retreated position as shown in FIG. 2A, in case where the wire harness 5 has received a force in a compressing direction at the same time when the wire harness has been bent or swayed. On the contrary, the rotary member 6 is brought into the advanced position as shown in FIG. 2B, in case where the wire harness 5 has received a force in a tensile direction at the same time when the wire harness has been bent or swayed.

For example, in case where the wire harness 5 has been installed from a vehicle body (not shown) to a sliding door in an automobile to be contained in the sliding door so as to be extended and contracted in a curved state, and the wire harness 5 has been connected to an auxiliary equipment such as an electrical component in the sliding door, while the devices 1 for fixing the wire harness have been fixed to the vehicle body, the rotary member 6 will retreat as shown in FIG. 2A, when the sliding door is opened and the wire harness 5 receives a force in a contracting direction. On the contrary, the rotary member 6 will advance as shown in FIG. 2B, when the sliding door is closed and the wire harness 5 receives a force in an extending direction.

As described above, the device 1 for fixing the wire harness is advantageous not only in installation and fixation of the wire harness 5 to the vehicle body but also in installation of the wire harness 5 in the sliding door. Because the wire harness 5 can be curved smoothly with a large radius R, the wire harness 5 will be prevented from being damaged or deformed. In case where the wire harness 5 has been curved with a small radius, an excessive bending stress badly affects the corrugate tube 8 and the electric wires 7 inside the tube, and the wire harness 5 will be liable to be damaged with time. In this embodiment, such inconveniences can be reliably eliminated due to the rotary member 6 which can freely advance and retreat, and the harness guide wall 32 having a length corresponding thereto.

Figure 4:
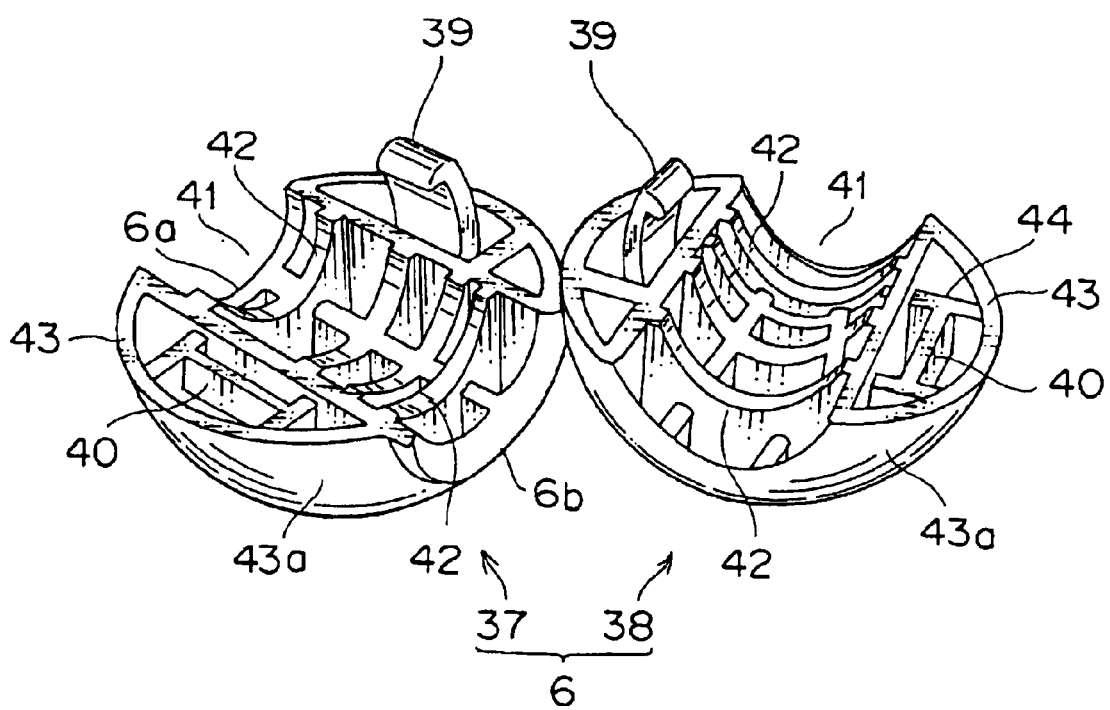
FIG. 4 is an exploded perspective view showing an embodiment of the rotary member.

The rotary member 6 is formed of synthetic resin in a dividable shape, as shown in FIG. 4 as one example. Two divisional members 37, 38 are formed symmetrically, and coupled to each other with locking means including flexible locking hooks 39 and locking steps 40. The locking means are not limited to a combination of the locking hooks 39 and the locking steps 40, but other locking means in an appropriate form can be employed.

A central channel 41 in a semicircular shape for holding the wire harness 5 is formed in each of the divisional members 37, 38 of the rotary member 6, and arc-shaped ridges 42 which are adapted to be engaged with grooves 8a (See FIG. 2A) of the corrugate tube 8 surrounding the wire harness are formed inside the channel 41. The wire harness 5 is arranged concentrically with a central axis of the rotary member 6. With an aid of the ridges 42, the corrugate tube 8 is held immovably in a longitudinal direction, but rotatably in a circumferential direction. Because the corrugate tube 8 receives a torsional force while it is bent or swayed, and rotates in a circumferential direction independently from the electric wires 7 contained therein, torsion of the corrugate tube 8 or breakdown occurring therefrom will be prevented.

Also with the rotary movement of the rotary member 6, the torsion of the corrugate tube 8 will be more reliably prevented.

Even if the corrugate tube 8 becomes fixed to the rotary member 6 so as not to rotate in a circumferential direction, the torsion of the corrugate tube 8 and the entire wire harness will be perfectly avoided, because the rotary member 6 freely rotates inside the holding part 30 in the body 3 of the fixing device. In this case, it is recommended that an inner diameter of the ridge 42 is set to be slightly smaller than an outer diameter of the groove 8a so that friction resistance between the ridge 42 and the groove 8a may be increased.

Each of the divisional members 37, 38 is provided with a wall part 43 in a semi-spherical shape which has a smooth arc-shaped face 43a on its outer periphery, and a plurality of ribs 44 for increasing rigidity inside the semi-spherical wall part 43. The locking hook 39 and the locking step 40 are provided in symmetry outside the central channel 41. By employing the ribs 44, the rotary member 6 can be made lightweight, and the rotation will be rendered more smooth. It is of course possible to fill all the spaces between the ribs 44 with synthetic resin. At opposite open ends of the channel 41, the forward end 6a and the rearward end 6b of the rotary member 6 are cut to form a flat plane. When the divisional members 37, 38 have been joined together, the two channels 41 are assembled into a cylindrical harness insertion bore (an insertion part) 41, and inside this harness insertion bore 41, the ridges 42 are assembled into an annular shape.

It is also possible that a harness insertion bore having an elliptical shape is formed in the rotary member 6, in correspondence with a flat-shaped corrugate tube (not shown) instead of the corrugate tube 8 having a round shape in cross section. Further, the outer shape of the rotary member 6 is not necessarily in a perfect spherical shape, but may be in a three dimensional arc-shape like a barrel or a rugby ball, for example, which can also permit the three dimensional rotation of the rotary member 6. Furthermore, the rotary member 6 can be made compact, by cutting away a middle part of the spherical outer peripheral face 43a to form an arc-shaped outer faces only at both forward and backward end portions of the rotary member 6.

It is also possible to employ a net-like or a ring-like flexible tube (not shown) made of synthetic resin as the protective tube, in place of the corrugate tube 8. In this case, the protective tube should be held immovably inside the rotary member 6, by grasping the protective tube between a pair of the divisional members 37, 38 of the rotary member 6. It is also possible that a plurality of the electric wires 7 are bound together with a vinyl tape and held in the rotary member 6, without employing the protective tube.

Still further, it is also possible that the holding part 30 in the body 3 of the fixing device is formed shorter in an axial direction or the harness guide wall 32 is omitted, in order that the rotary member 6 having a spherical shape or barrel-like shape may conduct the three dimensional rotation only. Alternatively, the harness guide wall 32 may be integrally provided at the forward end area of the rotary member 6 instead of being provided on the body 3 of the fixing device, within an extent that the three dimensional rotation of the rotary member 6 is not disturbed. Further, it is also possible that the rotary member 6 is formed as one piece (impossible to be divided), and a piece of plate (not shown) adapted to be engaged with the grooves 8a of the corrugate tube 8 is inserted into a hole (not shown) of the rotary member 6.

Referring to FIG. 1, even though the wire harness 5 is bent or swayed up and down, right and left, in a three dimensional direction, the rotary member 6 will rotate three dimensionally in all the directions, and accordingly, the wire harness 5 will be always curved smoothly with a large radius. In addition, since the wire harness 5 will be smoothly curved with a large radius along the harness guide wall 32 in a curved shape, an excessive bending force or breaking force to be exerted on the wire harness 5 will be prevented by a synergistic effect. As the results, damages with age of the wire harness 5 including the protective tube 8 and the electric wires 7 contained therein will be reliably prevented.

Because the rotary member 6 moves in a longitudinal direction of the wire harness, areas of the wire harness 5 which rub against the harness guide wall 32 are dispersed (change) and hence, abrasion of the surface of the wire harness, that is, the protective tube will be avoided. Further, because the rotary member 6 moves back and forth in a longitudinal direction, a tensile force and a compressive force acting on the wire harness 5 when it is being installed, bent or swayed will be moderated. In this manner too, the wire harness 5 can be prevented from being damaged or deformed.

Although the present invention has bee fully described by way of examples with reference to the accompanying drawings, it is to be noted that various changes and modifications can be made within a scope of the present invention.

What is claimed is:

1. A device for fixing a wire harness comprising;
   a rotary member which holds the wire harness and has an arc-shaped face in a three dimensional direction on its outer peripheral face, and
   a body of said fixing device in which said rotary member is held so as to rotate in a three dimensional direction, wherein said body of the fixing device is provided with a harness guide wall in a curved shape, the harness guide wall not contacting said rotary member.

2. The device for fixing a wire harness as claimed in claim 1, wherein said rotary member has a spherical shape.

3. The device for fixing a wire harness as claimed in claim 1, wherein said rotary member can be divided into pieces.

4. The device for fixing a wire harness as claimed in claim 1, wherein said rotary member has an insertion part in which a corrugate tube covering said wire harness is held.

5. A device for fixing a wire harness comprising;
   a rotary member which holds the wire harness and has an arc-shaped face in a three dimensional direction on its outer peripheral face, and
   a body of said fixing device in which said rotary member is held so as to rotate in a three dimensional direction,
   wherein said rotary member has an insertion part in which a corrugate tube covering said wire harness is held,
   wherein said rotary member is held in said body of the fixing device so as to move in a longitudinal direction of the wire harness.

6. The device for fixing a wire harness as claimed in claim 5, wherein said body of the fixing device has a space having a uniform inner diameter for receiving said rotary member, and stopper parts against which said rotary member is abutted at opposite ends of said space in an axial direction of the wire harness.

7. The device for fixing a wire harness as claimed in claim 6, wherein said stopper parts have smooth guide faces in correspondence with an outer peripheral face of said rotary member.

8. A device for fixing a wire harness comprising;
a rotary member which holds the wire harness and has an arc-shaped face in a three dimensional direction on its outer peripheral face, and
a body of said fixing device in which said rotary member is held so as to rotate in a three dimensional direction,
wherein either one of said body of the fixing device and said rotary member is provided with a harness guide wall in a curved shape,
wherein said harness guide wall has a longer wall portion which comes in contact with said wire harness when said rotary member has advanced along an axial direction of the wire harness, and a shorter wall portion which comes in contact with said wire harness when said rotary member has retreated along the axial direction of the wire harness.

9. The device for fixing a wire harness as claimed in claim 1, wherein said body of the fixing device can be divided.

10. The device for fixing a wire harness as claimed in any one of claim 1 to 7, 8, or 9, wherein said body of the fixing device is a part of a harness protector.

* * * * *